March 11, 1958 — H. C. O'REILLY — 2,825,988

SELF-FOLDING MAP-HOLDER

Filed May 17, 1954 — 2 Sheets-Sheet 1

INVENTOR.
HUGH CAMPBELL O'REILLY
BY
Kenyon & Kenyon
ATTORNEYS

March 11, 1958 H. C. O'REILLY 2,825,988
SELF-FOLDING MAP-HOLDER
Filed May 17, 1954 2 Sheets-Sheet 2
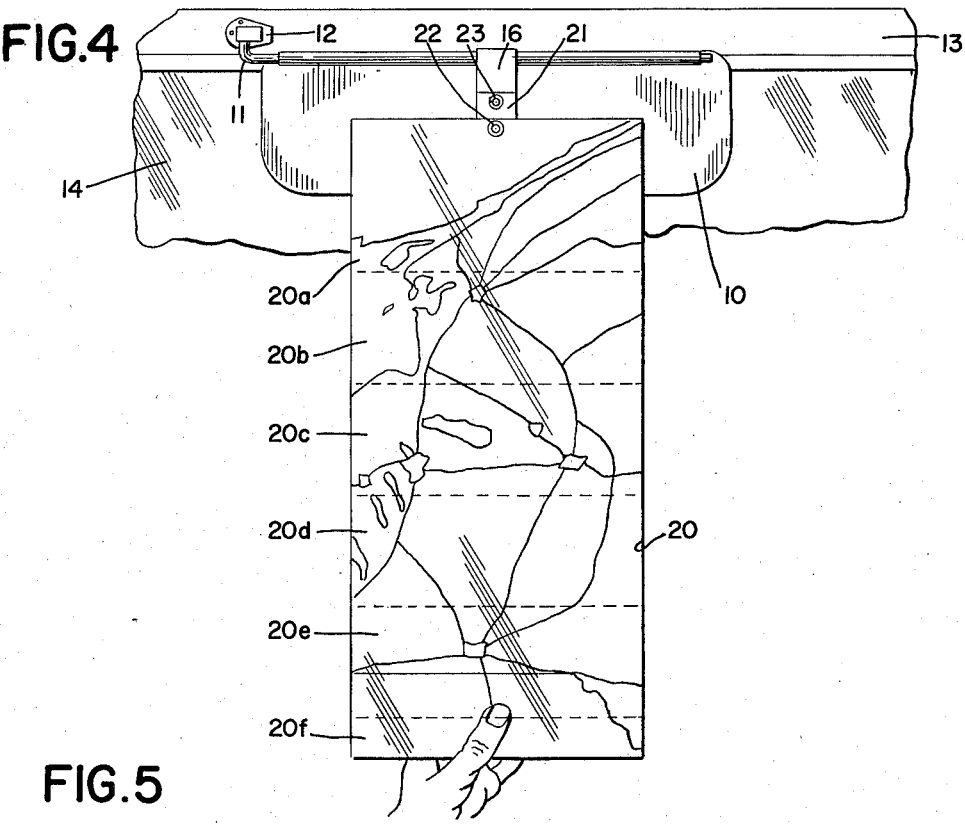
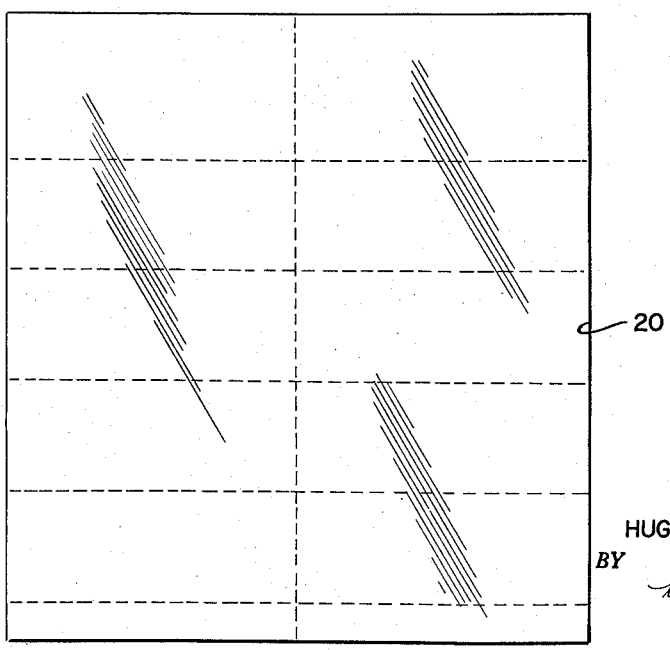
INVENTOR.
HUGH CAMPBELL O'REILLY
BY
ATTORNEYS United States Patent Office 2,825,988
Patented Mar. 11, 1958

2,825,988

SELF-FOLDING MAP-HOLDER

Hugh Campbell O'Reilly, New York, N. Y.

Application May 17, 1954, Serial No. 430,271

4 Claims. (Cl. 40—10)

This invention relates generally to self-folding transparent map-holders and more particularly to an improved self-folding map-holder adapted for attachment to the sun visor of an automobile.

Road maps are universally used by automobile drivers motoring extended distances over highways. When traveling an unfamiliar route, the driver must periodically check his bearings on the map to avoid taking a wrong turn or getting on the wrong road. It is usually necessary for the driver to unfold the map in order to find a desired panel thereon. Since a conventional highway map is printed on a large, rectangular paper sheet which is multi-folded for compactness in storage, the repeated unfolding and refolding of the map entailed in travel in a decided inconvenience. Moreover, in refolding a map for return to a storage compartment, it is frequently difficult to restore the map to its original folded condition with the title panel of the map on the exposed side. It is also found that with repeated handling of the map, the paper thereof becomes soiled and worn, thereby impairing the readability of the map.

In view of the foregoing, it is the principal object of the invention to provide an improved transparent and protective holder for a map facilitating the examination of the map contained therein, and which is self-folding to form a neat, compact package.

More particularly, it is an object of the invention to provide a map-holder of the above-described type which is readily attachable to the sun visor of an automotive vehicle, which may be conveniently consulted when necessary, and which folds into a small, compact form such that it is out-of-sight when not in use.

Still another object of the invention is to provide a transparent road map-holder having an adjustable strap, attachable to sun visors of various shapes and sizes and wherein the map-casing may be quickly unfolded to display the map therein, the casing automatically retracting to its folded condition when not in use.

It is also an object of the invention to provide a transparent self-folding map-holder wherein one half of the map inserted therein may be viewed on one side of the casing and the other half viewed on the other side thereof, and wherein the casing attached to the sun visor may readily be reversed in position to permit examination of the map on either side thereof.

Yet another object of the invention is to provide a transparent, self-folding holder of sturdy, efficient construction and of attractive design, which casing may be inexpensively manufactured. A feature of the invention resides in the fact that the map-holder may be distributed commercially as an advertising souvenir, the strap for mounting the casing onto the sun visor being adapted to display advertising matter.

For a better understanding of the invention, as well as other objects and further features thereof, reference is made to the following detailed description to be read in connection with the accompanying drawing, wherein like components of the holder in the several views thereof is identified by like reference numerals.

In the drawing:

Fig. 4 is a front, elevational view showing the casing in its open, operative position.

Fig. 5 is a plan view of the flat material forming the casing before it is folded.

Figure 1:
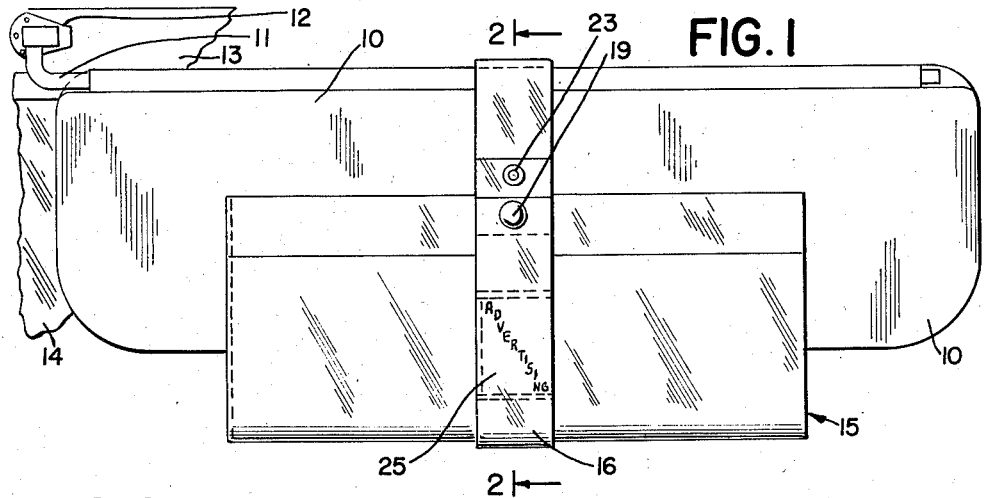
Fig. 1 is a front, elevational view of a map-casing, in accordance with the invention, installed on a conventional sun visor, the casing being held in its folded inoperative position.

Referring now to the drawings and more particularly to Figs. 1 to 5 there is shown a sun-flap or visor 10, rotatably secured at its upper marginal edge around a rod arm 11. Arm 11 is pivotally attached to a bracket 12 affixed to the inside frame 13 of a seating compartment having the usual windshield 14. Visors of this type are conventional and may be manually rotated to an out-of-the way horizontal position adjacent the top of the seating compartment.

Figures 2, 3:
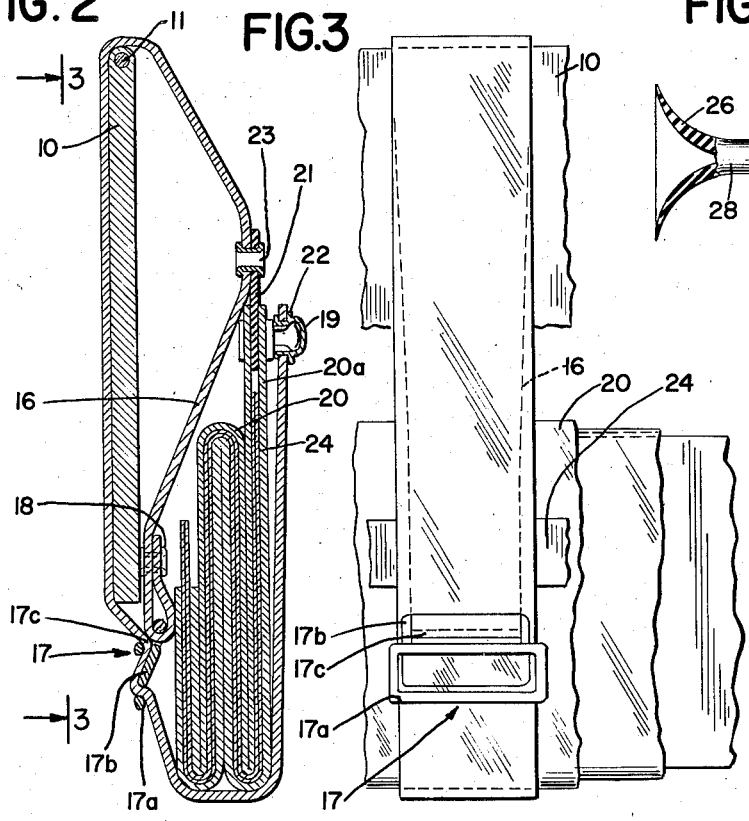
Fig. 2 is a vertical section taken through lines 2, 2 in Fig. 1.
Fig. 3 is a rear, elevational view of the casing.

A transparent map-holder is provided in accordance with the invention, the holder including a casing generally designated in Fig. 1 by reference numeral 15. Map-casing 15 is provided with an adjustable strap 16 and a buckle 17 in co-operation therewith for attaching the casing onto visors of different sizes and shapes. Buckle 17, as best seen in Figs. 2 and 3, is constituted by a rectangular frame portion 17a and a tongue portion 17b pivotally held therein. Tongue 17b has a slit 17c formed laterally therein. One end of the strap 16 is attached to tongue 17b, this being accomplished by looping the end through slit 17c and securing the loop by an eyelet or rivet 18. Strap 16 is encircled about visor 10 and passes under one leg of frame 17a, over the edge of tongue 17b and then under the opposing leg of frame 17a, the strap being drawn through the buckle to an extent sufficient to form a band securing the map-casing onto the visor. The free end of strap 16 terminates in the female element 19 of a conventional snap fastener.

The transparent casing for the map is preferably made from a single, rectangular sheet 20 of transparent, flexible material, fabricated for example of vinyl plastic or cellulose acetate. The over-all rectangular dimension of the sheet is substantially equal to that of a conventional road map. The characteristics of the material are such that when the sheet is pressed into creases the resultant folds are resiliently held therein. This may also be accomplished by combined heat and pressure depending on the nature of the material used. Hence, when the sheet is manually unfolded and thereafter released, it will revert to its initially folded state.

To form the map-casing, sheet 20 as best seen in Figs. 4 and 5 is first creased in half along its longitudinal center-line to provide an envelope having two opposing walls. It is then accordion-folded along transverse lines to form four intermediate panels 20b, 20c, 20d and 20e of like width and length, an upper end panel 20a of greater width and a lower end panel 20f of smaller width. For purposes of simplicity in illustration, a number of panels have been omitted in Fig. 2. It is to be understood that the envelope may also be formed by two sheets of material sealed together along one marginal edge.

The casing 15 is attached to strap 16 by means of a short strip 21, one end of which is firmly affixed to the upper edge of panel 20a at the center thereof by means of the male element 22 of a snap fastener. Element 22 extends through the two walls of panel 20a as well as strip 21. Elements 19 and 22 of the snap fastener are engageable with each other. The other end of strip 21 is pivotally connected to strap 16 at an intermediate point thereon adjacent the looped end thereof by means of a pivoting grommet or rivet 23.

A map 24 is contained within the envelope, the map being folded in half. Those sides of the map of interest to the driver are exposed to view, the map being inserted between the two main walls of the casing sheet 20. The casing, as pointed out hereinabove, is self-folding; hence, when not in use, the panels 20 a to f will tend to draw together to occupy juxtaposed, substantially parallel positions. To hold the folded casing snugly against the visor, one has merely to wrap strap 16 thereabout and snap the male element 19 onto female element 22, thereby forming the compact assembly shown in Fig. 2. To consult the map, one has but to snap off strap 16 and pull the casing downwardly by grasping the bottom panel 20f, as shown in Fig. 4. In the event it is desired to examine the reverse side of the map, it is necessary only to swing the casing about pivot 23.

It will be apparent that the casing serves to protect the map therein from dust and soiling by the user. While the map is not actually secured to the casing, it is held therein by reason of the resilient nature of the folds in the casing material. Obviously, the map may readily be replaced with other charts, as desired. It is also possible to mark a desired route on a map and to insert the marked map in the transparent casing, thereby avoiding the danger of smudging the route marking with continued use of the map.

As is evident from Fig. 1, when the map-casing is not in use, a flat portion of strap 16 lies across the casing and is clearly visible to the driver. This flat portion may be used for advertising purposes. This is accomplished by attaching thereto a small placard 25 or by printing directly on the strap. To receive the placard a small pocket may be formed on the strap by securing thereto at three edges a transparent panel of plastic or the like, the unsealed edge providing an opening into the pocket. Strap 16 is preferably made of a flexible, plastic material also transparent and the width of the strap may be enlarged to accommodate advertising matter of a desired size. Rather than attach the casing onto a visor, the casing may be carried separately as a map pouch. In this event, the casing is held together by strap 16 when not in use, the effective strap length being adjusted on the buckle so that when the snap fastener 19, 22 is closed, the casing is suitably compressed to form a compact package. Additional female snap fastener elements may be attached at spaced positions to the strap below element 19 to permit further adjustment of the strap about the casing panels.

Figure 6:
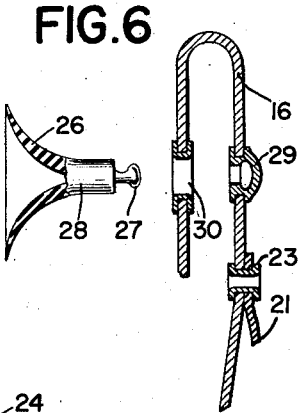
Fig. 6 is a modified means for attaching the map-casing onto a planar surface.

In lieu of a sun visor, the map-holder may be attached to a planar surface such as a window pane. This is accomplished as shown in Fig. 6 by means of a suction cup 26 having a male fastening element 27 secured thereto on a post 28. The strap 16 of the map-holder is provided at one point thereon above pivot 23 with a female element 29 and at another point spaced therefrom with an eyelet 30. To mount the holder on the window pane, the suction cup 26 is pressed thereon, the eyelet 30 is inserted on post 28 and the female element 29 is snapped into engagement with element 27, the map-casing being pivotally suspended from the strap.

While there has been shown what at present is considered to be a preferred embodiment of the invention, it will be obvious that many changes and modifications may be made therein without departing from the essential aspects of the invention. For example, a smaller or greater number of panel folds may be made in the map-casing. In the appended claims it is intended to cover all such changes and modifications as fall within the proper scope of the invention.

I claim:

1. A map holder adapted to be attached to a sun visor of a vehicle comprising a casing constituted by a rectangular sheet of flexible transparent material folded in half to form an envelope for receiving a similarly folded map, said envelope being accordian folded to define a plurality of panels, the folds of said envelope being of resilient construction whereby said panels are normally in superposed position, a strap, a buckle having a pivoted tongue member, means connecting one end of said strap to said tongue member, said strap winding through said buckle to form a band for surrounding said visor, means pivotally connecting one end of said envelope to an intermediate point on said strap, and means detachably connecting the other end of said strap to said end of said envelope.

2. A map holder adapted for attachment to a sun visor comprising a casing constituted by a map envelope having a pair of opposing walls, said envelope being accordian folded to form a plurality of panels, the folds of said envelope being of resilient construction whereby said panels are normally in superposed position, a strap, a buckle having a pivoted tongue member, one end of said strap being attached to said tongue member, said strap winding through said buckle to define a band for surrounding said sun visor, means including a strip pivotally connecting an end point on said envelope to said strap, said means further including a female snap fastener element attaching one end of said strip to said envelope at said end point thereon and a rivet pivotally connecting the other end of said strip to an intermediate point on said strap, and a male element attached to the other end of said strap to engage said female element.

3. A map holder adapted for attachment to a sun visor comprising a casing constituted by a rectangular sheet of flexible transparent material folded in half to form an envelope for receiving a similarly folded map, the envelope being accordian folded along transverse lines to form a plurality of normally superposed panels, said folds having a resilient construction whereby said panels may be extended to permit examination of said map, a strap, a buckle having a pivoted tongue member, one end of said strap being attached to said tongue member, said strap winding through said buckle to define a band for surrounding said sun visor, means including a strip pivotally connecting an end point on said envelope to said strap, said means further including a female snap fastener element attaching one end of said strip to said envelope at said end point thereon and a rivet pivotally connecting the other end of said strip to an intermediate point on said strap, and a male element attached to the other end of said strap to engage said female element, said strap being formed of transparent material and bearing advertising indicia exposed to view when said male and female elements are in engagement.

4. A map holder comprising a casing constituted by a rectangular sheet of flexible transparent material folded in half lengthwise to form an envelope for receiving a similarly folded map, said envelope being accordian folded along transverse lines to define a plurality of panels, said folds being of resilient construction to cause said panels normally to occupy superposed positions, and a strap attached at one end to said casing and adapted to encircle said panels, and means to attach said strap to a planar supporting surface including a suction cup device provided with a post and a male fastening element supported thereon, a female element attached to said strap at a point thereon, and an eyelet attached to said strap at a second point thereon, said eyelet being receivable on said post.

(References on following page)

References Cited in the file of this patent

UNITED STATES PATENTS

| | | |
|---|---|---|
| 1,533,694 | Chapman | Apr. 14, 1925 |
| 1,683,645 | Abbey | Sept. 11, 1928 |
| 1,687,304 | Morris | Oct. 9, 1928 |
| 1,887,502 | Epstein | Nov. 15, 1932 |
| 1,967,584 | McKenna | July 24, 1934 |
| 2,048,105 | Cobbs | July 21, 1936 |
| 2,118,964 | Bonnaire | May 31, 1938 |
| 2,293,979 | Hopkins | Aug. 25, 1942 |
| 2,431,472 | Fistell | Nov. 25, 1947 |
| 2,539,286 | Thompson | Jan. 23, 1951 |
| 2,557,523 | Victor | June 19, 1951 |
| 2,744,557 | Link | May 8, 1956 |
| 2,767,756 | Niles | Oct. 23, 1956 |